May 2, 1961 B. WILSON 2,982,922

FREQUENCY MULTIPLYING APPARATUS

Filed June 24, 1958 2 Sheets-Sheet 1

INVENTOR
BERNARD WILSON
BY
Fischstein, Fischstein & Ottinger
ATTORNEYS

May 2, 1961 B. WILSON 2,982,922

FREQUENCY MULTIPLYING APPARATUS

Filed June 24, 1958 2 Sheets-Sheet 2

INVENTOR
BERNARD WILSON
BY Kirschstein, Kirschstein & Ottinger
ATTORNEYS

United States Patent Office 2,982,922

Patented May 2, 1961

2,982,922

FREQUENCY MULTIPLYING APPARATUS

Bernard Wilson, Coventry, England, assignor to The General Electric Company Limited, London, England Filed June 24, 1958, Ser. No. 744,266

Claims priority, application Great Britain July 2, 1957

6 Claims. (Cl. 331—76)

This invention relates to apparatus for deriving from an input electric oscillation an electric oscillation having a frequency which is an integral multiple of that of the input oscillation.

In apparatus in accordance with the present invention for deriving from an input electric oscillation an electric oscillation having a frequency which is an integral multiple of that of the input oscillation, a resonator is provided with two coupling loops which are arranged each to be fed from a common input path by way of two rectifier elements, these two rectifier elements being so connected that they are caused to be conducting during alternate half cycles of an electric oscillation supplied over the input path, and means to couple an output path to the said resonator, the arrangement being such that when, during operation, an oscillation having a frequency F is supplied to the said input path, an oscillation of frequency $n$F, where $n$ is an integer greater than 1, is supplied by the output path.

The resonator may be either of the cavity type or an enclosed coaxial line system. A cavity resonator is one adapted to be excited so as to operate effectively as a closed section of waveguide while an enclosed coaxial line system may be considered as a cavity which has a central conductor and which is arranged to be excited so as to operate as a length of coaxial transmission line which is usually short-circuited at one end and open-circuited at the other.

One example of apparatus in accordance with the present invention for supplying an electric oscillation having a frequency in the region of 2,000 megacycles per second will now be described with reference to the accompanying drawings in which Figures 1 and 2 show a part sectional elevation and plan view respectively of the apparatus;

Figures 3 and 4 show in more detail a part of the apparatus, these figures being drawn to a larger scale than Figures 1 and 2 and Figure 4 being a part sectional elevation of the part while Figure 3 is a cross-sectional view at the line III—III in Figure 4;

Figures 1, 2:
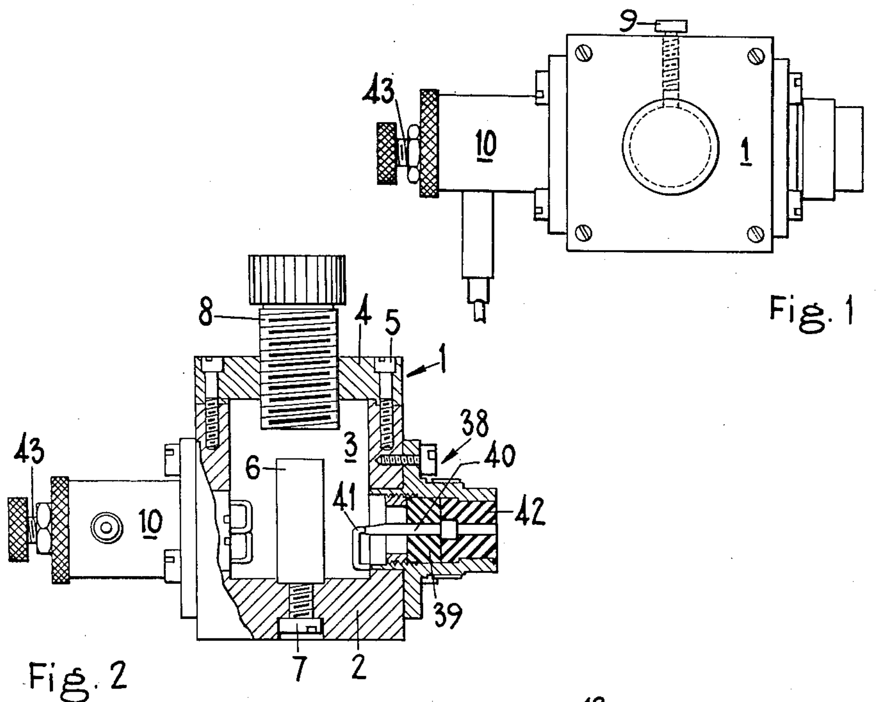

Referring now to Figures 1 and 2, the apparatus comprises a resonator 1 which is formed by a member 2 having a cylindrical cavity 3 that is open at one end and a member 4 which is held against the member 2 by means of screws 5 so as to close the cavity 3. A rod 6 lies axially within the cavity 3, this rod 6 being secured to the member 2 by means of a screw 7 and the rod 6 thereby being electrically connected to the member 2. The resonator 1 is thus in the form of an enclosed coaxial line system while the resonant frequency thereof may be adjusted by longitudinal movement of a member

8 which screws through the member 4. The position of the member 8 may be locked by means of a screw 9 (Figure 2).

Figure 3:
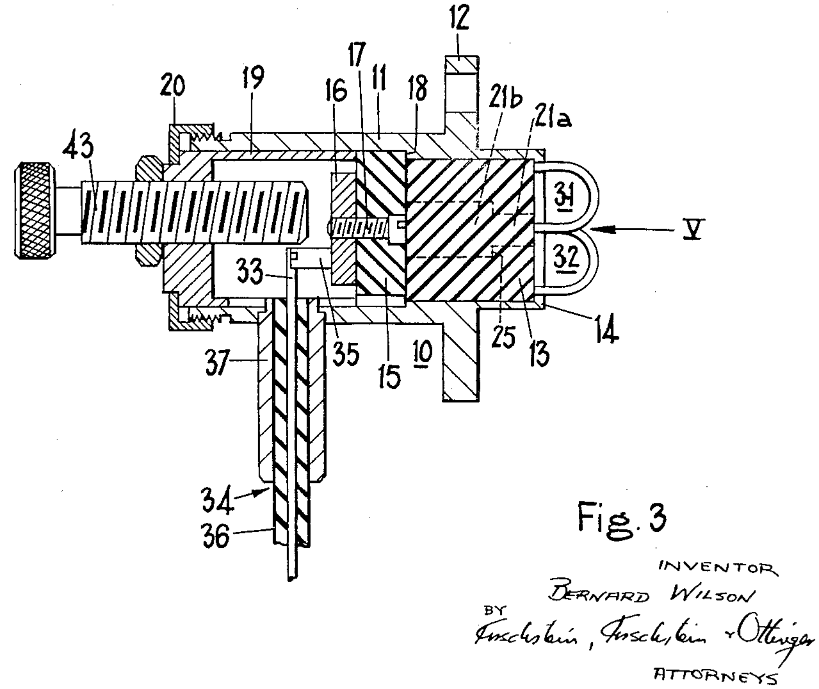
Figure 4:
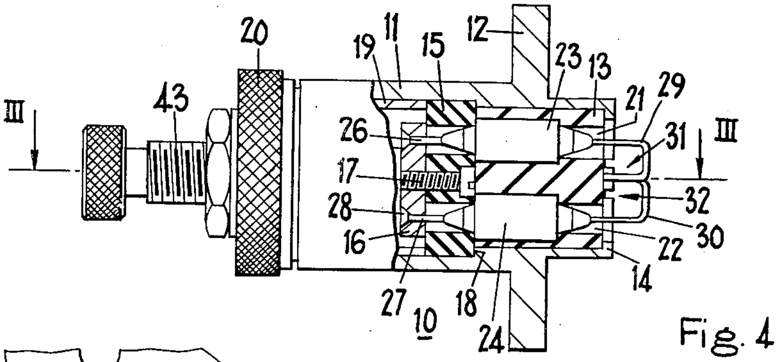

To one side of the resonator 1 there is provided an assembly 10 and the construction of this assembly 10 is shown in Figures 3 and 4.

Referring to these two figures, the assembly 10 comprises a generally cylindrical housing 11 with a flange 12 to enable the assembly to be bolted to the resonator 1. Within the housing 11 there is a member 13 of electric insulating material, this member being held captive between a lip 14 of the housing 11 and another member 15 which is also of electric insulating material. The member 15 has a metal plate 16 secured to it by means of a screw 17 and the member 15 is forced against an internal shoulder 18 of the housing 11 by a metal sleeve 19, this sleeve 19 being held in position by a cap 20 which screws over the end of the housing 11.

The member 13 has two holes 21 and 22 which extend right through it and these holes are utilised to house two germanium rectifier elements 23 and 24, these rectifier elements being of the point contact type. In fact the hole 21, for example, consists of two cylindrical parts 21($a$) and 21($b$) (Figure 3), the part 21($b$) being of greater diameter and the body of the rectifier element 23 is held captive in this part between the shoulder 25 and the member 15.

Terminal wires 26 and 27 of the rectifier elements 23 and 24 pass through holes in the plate 16 and are soft soldered thereto. During manufacture surplus wire and solder projecting from the surface 28 of the plate 16 are cleaned off to leave a smooth surface. The rectifier elements 23 and 24 are arranged so that unlike poles thereof are connected to the plate 16.

Figure 5:
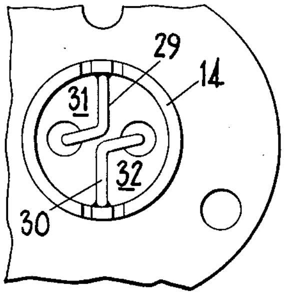
Figure 5 shows a view in the direction of the arrow V in Figure 3.

Referring now also to Figure 5, the other terminal wires 29 and 30 of the rectifier elements 23 and 24 are shaped to form loops 31 and 32 and are soft soldered to the lip 14 of the housing 11. Again surplus wire and solder are removed during manufacture.

The inner conductor 33 of a coaxial transmission line 34 is soldered to a tag 35 projecting from the plate 16. This coaxial line 34 constitutes an input path over which an electric oscillation is supplied to the apparatus and the outer conductor 36 of this coaxial line is electrically connected to the housing 11 by way of a metal sleeve 37.

As can be seen from Figure 1, the loops 31 and 32 project into the cavity 3 of the resonator 1 and during operation, these loops act as coupling loops to excite the resonator.

On the opposite side of the resonator 1 to the assembly 10, there is provided another assembly 38 which is also bolted to the member 2. This assembly 38 comprises a short length 39 of coaxial transmission line and at one end of this length of line the inner conductor 40 is connected to a coupling loop 41 which projects into the cavity 3 while at the other end there is a coaxial socket 42.

During operation of the apparatus, an electric oscillation having a frequency in the region of 400 or 500 megacycles per second is supplied over the coaxial line 34 and the resonator 1 is tuned by movement of the member 8 so that the resonator 1 is an enclosed coaxial line system having an electrical length equal to a quarter wavelength at the frequency of the output oscillation, that is to say a frequency in the region of 2,000 megacycles per second. During each half cycle of the input oscillation supplied over the line 36, one or the other of the two rectifier elements 23 and 24 is conducting so as to feed the appropriate coupling loop 31 or 32. It will be realised, however, that when either of the rectifier elements 23 or 24 is conducting, there is a low impedance between the plate 16 and the housing 11, which is earthed, so that the instantaneous voltage on the plate 16 cannot vary appreciably from earth potential.

This arrangement has the advantage that only a relatively small reverse voltage is developed across the rectifier element 23 or 24 that is not conducting during any particular half cycle of the input oscillation. Each of the rectifier elements 23 and 24 may, therefore, be driven harder without damage than would be possible if there were a larger reverse voltage developed during use, as would be the case with the rectifier element 23, say, if the rectifier element 24 and the coupling loop 32 were to be omitted. In this connection, it will be appreciated that the amplitude of the output oscillation supplied over the transmission line 40, which constitutes the output path of the apparatus, to the socket 42 is a function of the rate of change of current in the two coupling loops 31 and 32; accordingly it is desirable for the rectifier elements 23 and 24 to be driven as hard as possible.

In order to prevent the coupling loops 31 and 32 and the rectifier elements 23 and 24 damping the resonator 1 at this resonant frequency, an adjustably capacity is provided between the plate 16 and the housing 11. This is in the form of a screw 43 (see particularly Figure 3) which is arranged to screw into the end of the sleeve 19. By adjusting the position of the screw 43, the circuit formed by the rectifier elements 23 and 24, the coupling loops 31 and 32 and the housing 11 is tuned so that the coupling loops 31 and 32 present a high impedance at the output frequency.

It will be appreciated that in the arrangement described above the coupling loop 31 forms a right hand turn from the housing 11 in Figure 3 while the loop 32 forms a left hand turn. It follows that the two loops 31 and 32 aid one another in exciting the resonator 1 at a frequency equal to an even harmonic of the frequency of the oscillation supplied over the transmission line 34.

Figure 6:
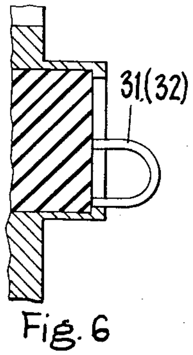
Figures 6 and 7 show an alternative arrangement of part of Figure 3.
Figure 7:
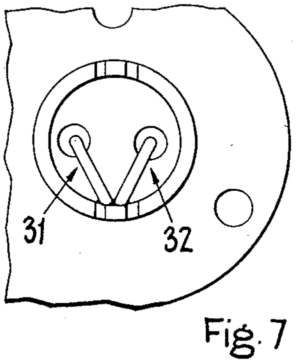

If, however, it is required to derive an output oscillation having a frequency equal to an odd harmonic of the input frequency, the arrangement may be modified in the manner shown in Figures 6 and 7 so that the coupling loops 31 and 32 both make turns of the same hand.

Figure 8:
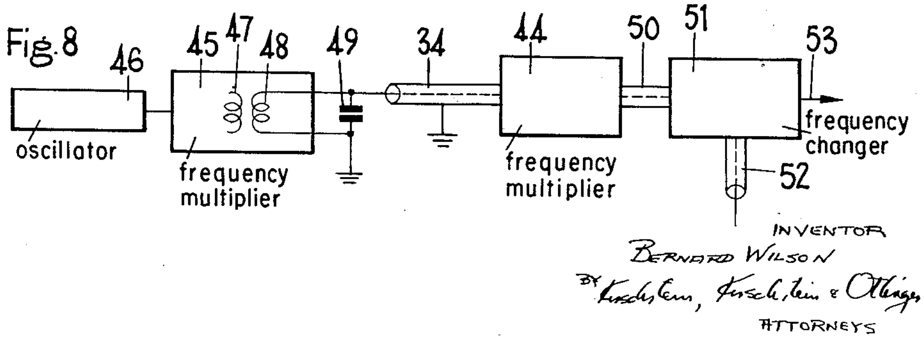
Figure 8 shows diagrammatically part of a superheterodyne radio receiver incorporating the apparatus shown in Figures 1 and 2.

It will be appreciated that the power available from the apparatus described above is somewhat limited but it is sufficient for the apparatus to supply the locally generated oscillation for heterodyning with a received signal in a superheterodyne radio receiver. Referring now to Figure 8 of the accompanying drawings which shows diagrammatically the circuit of part of such a receiver, the apparatus described above is shown by the rectangle 44. The oscillation supplied over the coaxial transmission line 34 to the apparatus 44 is derived by a frequency multiplier stage 45 from a crystal controlled oscillator 46. The output circuit and the frequency multiplier stage 45 includes a coil 47 to which is coupled another coil 48 which has a capacitor 49 connected across it to form a parallel resonant circuit tuned to the frequency of the oscillation supplied by the stage 45. One side of this parallel resonant circuit is earthed and the other or "live" side is connected to the inner conductor of the coaxial transmission line 34.

The electric oscillation derived by the apparatus 44 is fed over a coaxial transmission line 50 to a frequency changer 51, this line 50 having a plug (not shown) which connects with the socket 42 (Figure 1). The frequency changer 51 is arranged to heterodyne the received signal supplied over a coaxial transmission line 52 with the oscillation supplied over the line 50 so as to derive an intermediate frequency signal which has a frequency of, say, 70 megacycles per second, and which is supplied over a path 53.

Alternatively apparatus described with reference to Figures 1 to 7 may be used in a transmitter, the electric oscillation supplied by the apparatus being amplified and then passed to a frequency changer that is arranged to operate at a high level of signal. This frequency changer may heterodyne the amplified oscillation with a modulated signal having a frequency in the region of 70 megacycles per second, say, one of the resulting sidebands being filtered off to give the signal that is transmitted.

I claim:

1. Apparatus for deriving from an input electric oscillation an electric oscillation having a frequency that is an integral multiple of that of the input oscillation comprising a resonator, first and second coupling loops mounted in said resonator, an input path, first and second rectifier elements, means to connect the first rectifier element between the first coupling loop and the input path so that this rectifier element presents a low impedance to the flow of current towards the input path, means to connect the second rectifier element between the second coupling loop and the input path so that this rectifier element presents a low impedance to the flow of current away from the input path, an output path, and means to couple the output path to said resonator, the coupling loops exciting the resonator at a harmonic of the input frequency so that when, during operation, an oscillation having a frequency F is supplied to the said input path, an oscillation of frequency $n$F, where $n$ is an integer greater than 1, is supplied by the output path.

2. Apparatus according to claim 1 wherein the resonator is an enclosed coaxial line system.

3. Apparatus according to claim 1 wherein there is provied variable capacity means which is connected in circuit with the two coupling loops and the two rectifier elements and which is arranged to be tuned so that the coupling loops provide little damping on the resonator at the frequency $n$F.

4. Apparatus according to claim 3 wherein the two rectifier elements, the two coupling loops and the said variable capacity means together form an assembly which is secured to one side of the resonator so that the coupling loops lie at least partially within the cavity of the resonator.

5. Apparatus according to claim 1 wherein $n$ is even integer.

6. Apparatus according to claim 1 wherein $n$ is an odd integer.

References Cited in the file of this patent

UNITED STATES PATENTS

| | | |
|---|---|---|
| 2,550,409 | Fernsler | Apr. 24, 1951 |
| 2,616,037 | Wheeler et al. | Oct. 28, 1952 |
| 2,817,760 | Dobbertin | Dec. 24, 1957 |

OTHER REFERENCES

General Radio Experimenter, vol. 26, No. 2, July 1951, "Harmonic Generation . . . Diodes," pp. 6–8.